United States Patent
Monahan et al.

(10) Patent No.: US 7,283,176 B2
(45) Date of Patent: Oct. 16, 2007

(54) METHOD AND SYSTEM FOR DETECTING FIELD ID

(75) Inventors: Chuck Monahan, Mountain View, CA (US); Aleksandr Movshovich, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 394 days.

(21) Appl. No.: 10/871,643

(22) Filed: Jun. 17, 2004

(65) Prior Publication Data
US 2005/0200758 A1    Sep. 15, 2005

Related U.S. Application Data

(60) Provisional application No. 60/552,988, filed on Mar. 12, 2004.

(51) Int. Cl.
*H04N 5/08* (2006.01)

(52) U.S. Cl. ...................... 348/526; 348/525

(58) Field of Classification Search ............... 348/526, 348/558, 554, 441, 513, 525
See application file for complete search history.

(56) References Cited

U.S. PATENT DOCUMENTS

| | | | | |
|---|---|---|---|---|
| 4,400,719 A | | 8/1983 | Powers | |
| 4,792,853 A | * | 12/1988 | Yamagishi et al. | 348/526 |
| 5,247,359 A | * | 9/1993 | Okada et al. | 348/526 |
| 5,420,640 A | * | 5/1995 | Munich et al. | 348/525 |
| 5,473,387 A | * | 12/1995 | Okada et al. | 348/526 |
| 6,118,491 A | * | 9/2000 | Wu et al. | 348/526 |
| 6,160,589 A | * | 12/2000 | Sadowski | 348/526 |
| 6,469,745 B1 | * | 10/2002 | Yamada et al. | 348/558 |

* cited by examiner

*Primary Examiner*—Victor R. Kostak
(74) *Attorney, Agent, or Firm*—McAndrews, Held & Malloy, Ltd.

(57) ABSTRACT

Methods and systems for determining fields in a video signal are disclosed. Historic field ID values for a received video signal may be stored and subsequently utilized by a summer and/or a correlator in order to estimate a field ID value for a current field. The summer may sum all historic field ID values and, if the sum is within a determined range, for example, the field ID value for a current field may be estimated based on the sum of the historic field ID values. If the sum is not within the determined range, for example, the historic field ID values may be correlated with an expected field ID value or with an inverted expected field ID value. The correlation may then be utilized to estimate the field ID value for the current field.

27 Claims, 6 Drawing Sheets

METHOD AND SYSTEM FOR DETECTING FIELD ID

CROSS-REFERENCE TO RELATED APPLICATIONS/INCORPORATION BY REFERENCE

This application makes reference to, claims priority to, and claims the benefit of U.S. Provisional Application Ser. No. 60/552,988, filed Mar. 12, 2004 and entitled "Field ID Detection."

This application makes reference to:
U.S. application Ser. No. 10/945,769 filed Sep. 21, 2004;
U.S. application Ser. No. 10/968,416 filed Oct. 19, 2004;
U.S. application Ser. No. 10/875,422 filed Jun. 24, 2004;
U.S. application Ser. No. 10/945,619 filed Sep. 21, 2004;
U.S. application Ser. No. 10/945,587 filed Sep. 21, 2004;
U.S. application Ser. No. 10/871,758 filed Jun. 17, 2004;
U.S. application Ser. No. 10/945,796 filed Sep. 21, 2004;
U.S. application Ser. No. 10/945,817 filed Sep. 21, 2004;
U.S. application Ser. No. 10/945,729 filed Sep. 21, 2004;
U.S. application Ser. No. 10/945,828 filed Sep. 21, 2004; and
U.S. application Ser. No. 10/946,152 filed Sep. 21, 2004.

The above stated applications are hereby incorporated herein by reference in their entirety.

FIELD OF THE INVENTION

Certain embodiments of the invention relate to processing of video signals. More specifically, certain embodiments of the invention relate to a method and system for field ID detection.

BACKGROUND OF THE INVENTION

A conventional video decoder may utilize field identification (ID) information in order to properly decode a progressive and/or an interlaced video signal, for example. An interlaced video signal may be characterized by two field ID values, a zero and a one, for example. Each interlaced video frame may be decoded in two parts and each part may be characterized by a specific field ID value. The zero field ID value may be associated with a top part of an interlaced video frame, and the one field ID value may be associated with a bottom part of the interlaced video frame. The top part of a decoded interlaced video frame may be transmitted first and the bottom part of the decoded interlaced video frame may be transmitted second. In this way, a video decoder may receive alternating field ID values, which are characteristic of a top or a bottom part of a decoded interlaced video signal frame.

A progressive video signal frame may be decoded in its entirety with only one pass. A progressive video signal, therefore, may be characterized by only one field ID value, a zero or a one, for example. Receiving the same field ID values for a specific video signal may indicate, therefore, that a progressive video signal is being decoded by a video decoder.

Field ID detection may be obtained in a video decoder by comparing the timing relationship between the horizontal (H) and vertical (V) synchronization pulses. In order to enhance the accuracy of the field detection process, the information about the phase of the color subcarrier may be incorporated in the decision making process. In a noisy environment, the information obtained during any given single measurement of the field ID may be inaccurate and may cause a very specific distortion of the image, which may be referred to as a field swap. For example, a field swap may occur if the video decoder is decoding an interlaced video signal. In this case, instead of receiving alternating field ID values associated with a top and a bottom decoded video frame, the video decoder may start receiving the same field ID value. Various techniques, such as field ID phase lock loops (PLLs) and sophisticated signal processing of the incoming signal, for example, may be utilized to avoid undesired field swaps. This may complicate the implementation of the video decoder and may increase the number of gates in the silicon, for example, as well as the overall power consumption of the device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for determining fields in a video system. Aspects of the method may include generating a history of field identification (ID) values for a received video signal, generating a correlation based on the history of field ID values, and estimating a field ID value for a current field based on at least one of the generated correlation and the generated history of field ID values. The generated history of field ID values may be stored in a register. If a new filed ID value is generated, the stored history of field ID values may be shifted.

The historic field ID values may be summed, and if the sum of the stored historic field ID values is within a determined range, the field ID value for a current field may be estimated based on the sum of the stored historic field ID values. The historic field ID values may be correlated with an expected field ID value. The historic field ID values may also be correlated with an inverted expected field ID value and may be XORed with an expected field ID value or with an inverted expected field ID value.

Aspects of the system for determining fields in a video system may include a shift register that creates a history of field ID values for a received video signal, a correlator that correlates field ID values based on the history of field ID values, and a processor that estimates a field ID value for a current field based on at least one of the correlation and the history of field ID values. The shift register may be utilized to store the history of field ID values. The shift register may shift the stored history of field ID values whenever a new field ID value is generated. A summer may be utilized to sum the historic field ID values.

If the sum of the historic field ID values is within a determined range, the processor may estimate the field ID value for a current field based on the sum of the historic field ID values. The correlator may correlate the historic field ID values with an expected field ID value and/or with an inverted expected field ID value. A plurality of XOR gates may be utilized to XOR the historic field ID values with an expected field ID value. The plurality of XOR gates may also be utilized to XOR the historic field ID values with an inverted expected field ID value.

In another aspect of the present invention, a system for determining fields in a video system may include a shift register, a plurality of XOR gates, a first summer, a second summer, and an inverter. The shift register may comprise a plurality of flip-flops. At least one input of each of the plurality of XOR gates may be coupled to an output of each of the plurality of flip-flops. The first summer may be coupled to an output of each of the plurality of XOR gates, forming a correlator. The second summer may be coupled to the output of each of the plurality of flip-flops. The inverter may be coupled to a second input of each of the plurality of XOR gates.

These and other advantages, aspects and novel features of the present invention, as well as details of an illustrated embodiment thereof, will be more fully understood from the following description and drawings.

DETAILED DESCRIPTION OF THE INVENTION

Figure 1A:
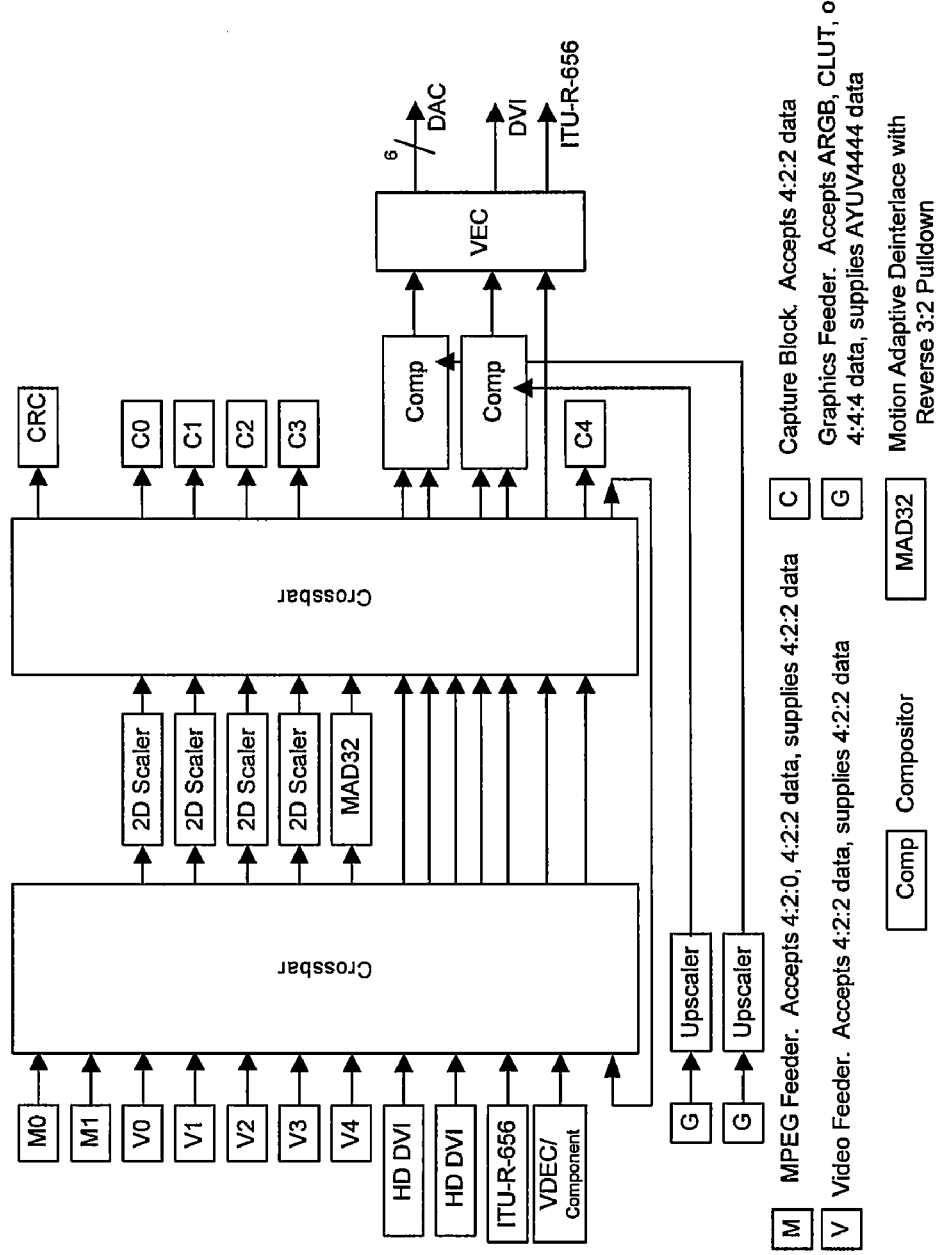
FIG. 1A is a block diagram of an exemplary architecture illustrating the positioning of a MAD-3:2, in accordance with an embodiment of the present invention.

Certain aspects of the present invention may be found in a method and system for determining fields. Historic field ID values for a received video signal may be stored and subsequently utilized by a plurality of summers in order to estimate a field ID value for a current field. A correlator utilized in accordance with the invention may comprise a plurality of XOR gates coupled with a first summer. A second summer may sum all historic field ID values. If the sum is within a determined range, for example, the field ID value for a current field may be estimated based on the sum of the historic field ID values. If the sum is not within the determined range, for example, the historic field ID values may be correlated with an expected field ID value or with an inverted expected field ID value. The correlation may then be utilized to estimate the field ID value for the current field.

Certain other aspects of the invention may also comprise a plurality of algorithms and architectures for a motion adaptive deinterlacer (MAD) capable of reverse 3:2 pull-down and 3:2 pull-down cadence detection, which may be utilized in a video network (VN). The algorithms and architectures for the motion adaptive deinterlacer may be adapted to acquire interlaced video fields from one of a plurality of video sources in the video network and convert the acquired interlaced video fields into progressive frames, at double the display rate, in a visually pleasing manner.

The motion adaptive deinterlacer (MAD-3:2) may be adapted to accept interlaced video input from a video bus (VB) and output deinterlaced, progressive video to the video bus (BUS) utilized by the video network. The motion adaptive deinterlacer may accept up to, for example, 720×480i and produce, for example, 720×480p in the case of NTSC. For PAL, the motion adaptive deinterlacer (MAD) may accept, for example, 720×576i and produce, for example, 720×576p. Horizontal resolution may be allowed to change on a field by field basis up to, for example, a width of 720. The motion adaptive algorithm utilized by the motion adaptive deinterlacer (MAD-3:2) may be adapted to smoothly blend various approximations for the missing pixels to prevent visible contours produced by changing decisions. A plurality of fields of video may be utilized to determine motion. For example, in an embodiment of the invention, five fields of video may be utilized to determine motion. The motion adaptive deinterlacer (MAD) may produce stable non-jittery video with reduced risk of visual artifacts due to motion being misinterpreted while also providing improved still frame performance. The motion adaptive deinterlacer (MAD-3:2) may also provide additional fields per field type of quantized motion information which may be selectable in order to reduce the risk of misinterpretation. For example, up to three (3) additional fields or more, per field type, of quantized low-cost motion information may optionally be selected in order to reduce risk of misinterpreted motion even further. This may provide a total historical motion window of up to, for example, 10 fields in a cost effective manner. An integrated cross-chrominance removal functionality may be provided, which may aid in mitigating or eliminating NTSC comb artifacts. A directional compass filtering may also be provided in order to reduces or eliminate jagged edges in moving diagonal edges. The MAD-3:2 may provide reverse 3:2 pull-down for improved quality from film based sources.

In accordance with another aspect of the invention, the algorithms and architectures for the motion adaptive deinterlacer (MAD) may also be adapted to provide bad-edit detection in order to ensure a visually pleasing transition to new cadence in situations where editing may have been carelessly performed. Furthermore, per-pixel correction may also be provided to improve the quality of subject matter containing both film and video at the same time. For example, per-pixel correction may be utilized for interlaced titles which have been overlaid on film based content. The motion adaptive deinterlacer (MAD-3:2) may also provide optional CPU control over, for example, 3:2 and/or 2:2 cadence detection and correction.

FIG. 1A is a block diagram of an exemplary architecture illustrating the positioning of a MAD-3:2, in accordance with an embodiment of the present invention. Referring to FIG. 1A, the MAD-3:2 along with a plurality of scalers, for example, may be positioned between a first crossbar and a second crossbar. The first crossbar may be referred to as an input crossbar and the second crossbar may be referred to as an output crossbar.

The MAD-3:2 may comprise at least one video network input and at least one video network output and is configured to maintain its own additional field stores. A feedback path may be provided from the output of the second crossbar to the input of the first crossbar. This may allow any of the standard definition (SD) video sources such as the mpeg feeders, video feeders, and/or VDEC, and so on, to function as an input to the MAD-3:2. The output of the second crossbar may be passed back to the first crossbar via the feedback path and be routed through, for example, a scaler to upscale the 480p output of the deinterlacer to 720p.

In accordance with another aspect of the present invention, field ID detection may be utilized in the VDEC component. More specifically, after a composite video signal is received and decoded by the VDEC component, field identification may be obtained in order to determine whether the decoded video signal is progressive and/or interlaced, for example, and to further facilitate the proper display of the decoded video signal. Two field ID values may be received for an interlaced video signal, and a single field ID value may be received for a progressive video signal. If the received video signal comprises an interlaced video signal, the two field ID values may be associated with a top and a bottom video frame, which are both required for the proper display of the decoded interlaced video signal. If the received video signal comprises a progressive video signal, only a single field ID value may be utilized for the displaying of the decoded progressive video signal.

Figure 1B:
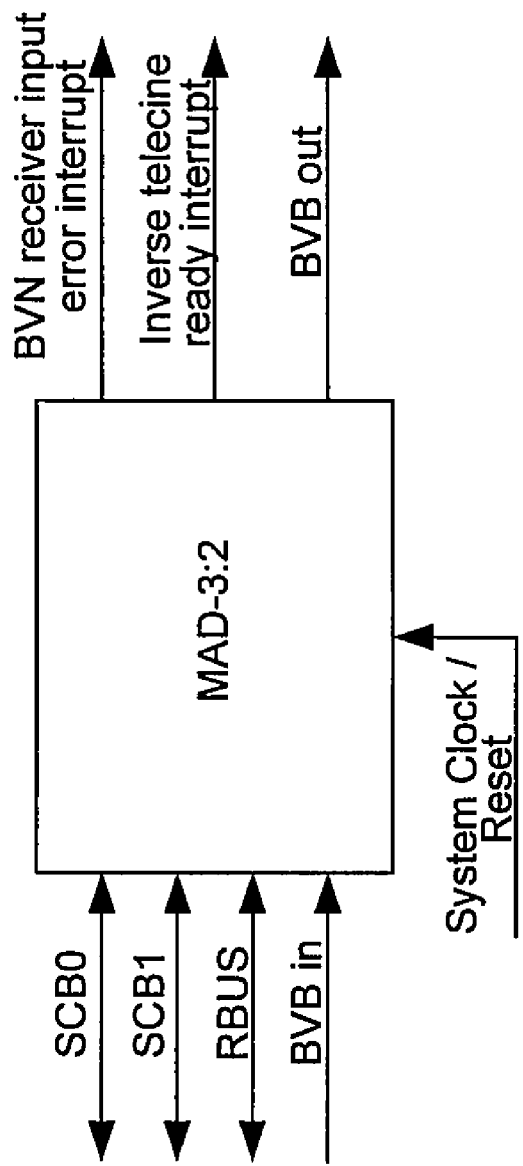
FIG. 1B is a block diagram illustrating exemplary interfaces for the MAD-3:2 shown in FIG. 1A, in accordance with an embodiment of the present invention.

FIG. 1B is a block diagram illustrating exemplary interfaces for the MAD-3:2 shown in FIG. 1A, in accordance with an embodiment of the present invention. Referring to FIG. 1B, the MAD-3:2 may comprise a plurality of bus interfaces and may include the capability to generate one or more system CPU interrupts. The MAD-3:2 may run on, for example, a single system clock. However, the invention may not be so limited and more than one clock may be utilized. In one embodiment of the invention, the MAD-3:2 may include a video bus (VB) input, a video bus output, and, for example, two independent bidirectional read/write SCB client connections. The video bus (VB) input may be utilized for supplying fields to the MAD-3:2. The video bus output may allow the deinterlaced output frames to be transferred throughout the video network and passed through a scaler before reaching a composite or capture block. An RBUS interface may be utilized to configure the MAD-3:2 or to access its status via one or more interface signals and/or registers. At least a portion of the interfaces of the MAD-3:2 may be synchronous to a clock input of the scaler. A video network receiver input error interrupt may be generated on an input field size which differs from a programmed field size which is expected. An inverse telecine ready interrupt may be generated for every field, or at least some fields, at the point in time when the statistics gathered in the previous field are ready to be read by a CPU or other processor.

Figure 1C:
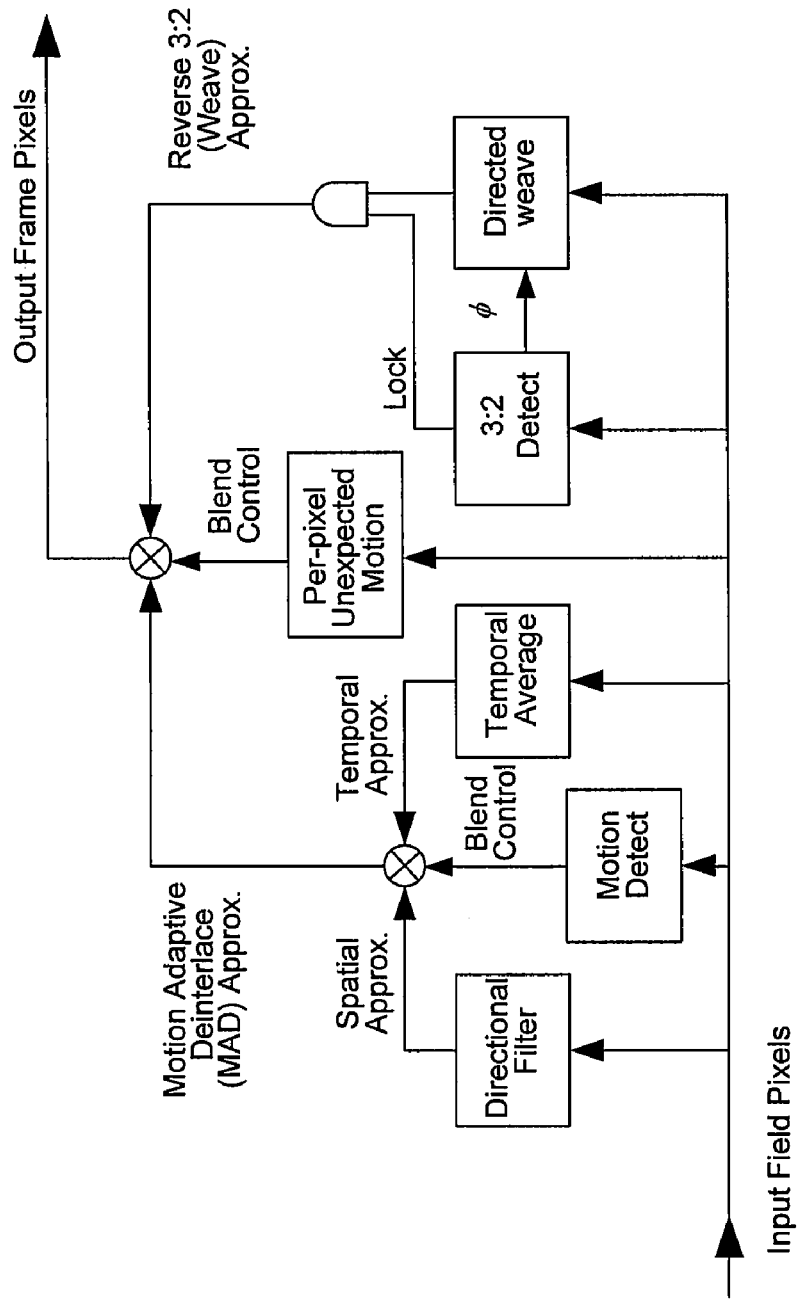
FIG. 1C is a block diagram illustrating an exemplary flow of the algorithm which may be utilized by the MAD-3:2 of FIG. 1A and FIG. 1B, in accordance with an embodiment of the present invention.

FIG. 1C is a block diagram illustrating an exemplary flow of the algorithm which may be utilized by the MAD-3:2 of FIG. 1A and FIG. 1B, in accordance with an embodiment of the present invention. Referring to FIG. 1C, there is shown a data flow corresponding to the algorithm utilized for deinterlacing the luma component of video. The algorithm may effectively be divided into two halves. For example, diagrammed on the left of FIG. 1C is the motion adaptive deinterlace (MAD) method of deinterlacing and on the right, there is shown the reverse 3:2 pulldown method. For every output pixel, motion adaptive deinterlacing, reverse 3:2 pulldown, or a blend of motion adaptive deinterlacing and reverse 3:2 deinterlacing may be utilized. In accordance with various embodiments of the invention, the blends may be adaptively controlled to give the best visually pleasing approximation of an output frame based on the type of source fields which are provided.

Figure 2:
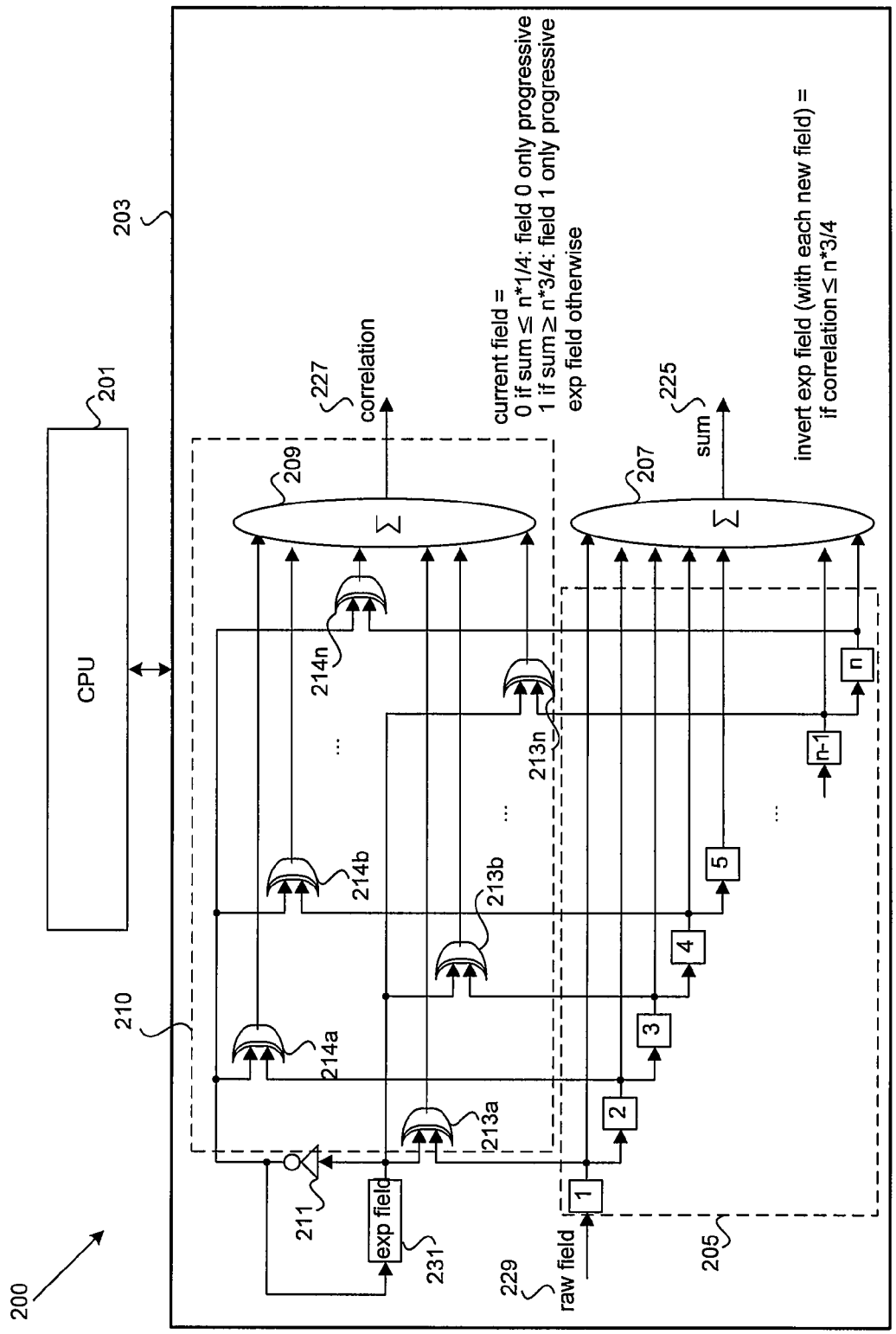
FIG. 2 is a block diagram illustrating an exemplary field ID detection system, in accordance with an embodiment of the present invention.

FIG. 2 is a block diagram illustrating an exemplary field ID detection system 200, in accordance with an embodiment of the present invention. Referring to FIG. 2, the field ID detection system 200 may comprise a processor (CPU) 201 coupled to a field ID processing module 203. The CPU 201 may be adapted to estimate a field ID value for a current field based on a correlation and/or a sum generated by the field ID processing module 203. The field ID processing module 203 may comprise a shift register 205, a correlator 210, an inverter 211, and a summer 207. The shift register 205 may comprise a plurality of flip-flops 1, 2 . . . n, where each of the n flip-flops may be adapted to store a single field ID value. The correlator 210 may comprise a summer 209 and a plurality of XOR gates 213a, 213b, . . . , 213n, 214a, 214b, . . . , 214n.

One of the inputs of the XOR gates 213a, 213b, . . . , 213n, 214a, 214b, . . . , 214n may be coupled to the outputs of the flip-flops 1, . . . , n. The inverter 211 may be coupled to a second input of the XOR gates 213a, 213b, . . . , 213n, 214a, 214b, . . . , 214n. Each of the outputs of the n flip-flops may be coupled to the summer 207, and each of the outputs of the XOR gates 213a, 213b, . . . , 213n, 214a, 214b, . . . , 214n may be coupled to the summer 209. In addition, each of the outputs of the odd number of flip-flops may be coupled to the XOR gates 213a, 213b, . . . , 213n, and each of the outputs of the even number of flip-flops may be coupled to the XOR gates 214a, 214b, . . . , 214n.

In operation, a raw field ID value 229 may be received by the shift register 205 and it may be initially stored in flip-flop 1. As new field ID values are received by the shift register 205, the content of the flip-flops may be shifted so that the most recent field ID value may be stored in flip-flop 1. In this way, the shift register 205 may store a history of n field ID values, for example. The n historic field ID values stored in the shift register may be communicated to the summer 207. The summer 207 may be adapted to sum or add the n historic field ID values to generate the sum 225. Although a single summer is illustrated, a plurality of summers may be utilized.

In one aspect of the present invention, the field ID detection system 200 may be utilized to process a progressive video signal, which may be characterized with only a single field ID value, a zero or a one, for example. Therefore, for a progressive video signal processed by the field ID detection system 200, the historic field ID values stored in the shift register 205 may comprise mostly one type of field ID value, zeros or ones. After the n historic field ID values are communicated to the summer 207, a sum 225 may be generated by the summer 207 and may be utilized by the field ID detection system 200 to estimate a current field ID value for a progressive video signal. If the field ID values for a progressive video signal are zero, the sum 225 may also be zero. Similarly, if the field ID values for a progressive video signal are one, the sum 225 may equal n since the shift register 205 comprises n flip-flops, each storing an historic field ID value of one. If the progressive video signal does not contain any distortions and/or noise, the sum 225 for a progressive video signal may be n or zero. Accordingly, the field ID value for a current field may be estimated to be zero if the sum 225 is zero, and one if the sum 225 is n.

If the progressive video signal contains any distortions and/or noise, the historic field ID values may not be all the same. For example, for a progressive video signal characterized by a field ID value of one, there may be one or more flip-flops within the shift register 205 which may be storing an historic field ID value of zero. In this case, the sum 225 may be less than a total of n. The sum 225, therefore, may be compared to a first threshold and it may be determined whether the sum 225 is greater than the first threshold. If the sum 225 is greater than the first threshold, then the CPU 201 may estimate that a field ID value for a current video frame equals one.

In a different aspect of the present invention, the first threshold may comprise a value equal to three-quarters of the total number of flip-flops n within the shift register 205. While the first threshold value may comprise three-quarters of the value n, the present invention is not limited in this way. Accordingly, the first threshold may comprise any value sufficiently close to n, for example, a value greater than three-quarters of n.

In a somewhat similar manner, for a progressive video signal characterized by a field ID value of zero, there may be one or more flip-flops within the shift register 205 which may be storing an historic field ID value of one. In this case, the sum 225 may be more than zero. In a case where the progressive video signal may comprise noise and/or distortions, the sum 225 may be compared to second threshold and it may be determined whether the sum 225 is smaller than the second threshold. If the sum 225 is smaller than the second threshold, then the CPU 201 may estimate that a field ID value for a current video frame is zero.

In another aspect of the present invention, the second threshold may comprise a value equal to one-quarter of the total number of flip-flops n within the shift register 205. While the second threshold value may comprise one-quarter of the value n, the present invention is not limited in this way. Accordingly, the second threshold may comprise any value sufficiently close to zero, for example, a value smaller than one-quarter of n.

In yet another aspect of the present invention, the field ID detection system 200 may be processing an interlaced video signal. Since an interlaced video signal processed by the field ID processing module 205 may be characterized by alternating field ID values of zeros and ones, the sum 225 of historic field ID values may be close to one-half of the value n. Interlaced video signals, therefore, may be recognized by the field ID processing module 203 by comparing the sum 225 to the first threshold and the second threshold value. For example, if the sum 225 is between the first threshold and the second threshold, the CPU 201 may determine that the video signal that is currently being processed by the field ID processing module 203 comprises an interlaced video signal.

An expected field ID value 231 may be utilized by the correlator 210 in order to obtain the correlation 227 of the outputs of all XOR gates 213*a*, 213*b*, . . . , 213*n*, 214*a*, 214*b*, . . . , 214*n*. For each raw field ID value 229, the expected field ID value may comprise a value of zero or one. For each subsequent raw field ID value, the expected field ID value 231 may be inverted by the inverter 211. In this way, the expected field ID value may be constantly alternating between a field ID value of zero and one. Since the initial value of the expected field ID value 231 may be zero or one, the XOR gates 213*a*, 213*b*, . . . , 213*n*, 214*a*, 214*b*, . . . , 214*n* may XOR only the same or only different values. The correlation 227, therefore, may comprise a value of zero, if all XOR gates XOR the same field ID values, and a value n, if all XOR gates XOR different field ID values. The field ID detection system 200 may estimate a field ID value for a current interlaced video frame based on the expected field ID value 231 and the correlation 227 generated by the summer 209 within the correlator 210. The correlation 227 may be compared to a third threshold value in order to determine whether a current field ID value may be equal to the expected field ID value 231, or an inverted expected field ID value. For example, the CPU 201 may determine that a field ID value for a current interlaced video frame may be equal to the expected field ID value 231 if the correlation 227 is greater than the third threshold value. Alternatively, the CPU 201 may determine that a field ID value for a current interlaced video frame may equal the inverted expected field ID value if the correlation 227 is less than or equal to the third threshold value. In a different aspect of the present invention, the threshold value may comprise a value equal to about three-quarters of the total number of flip-flops n within the shift register 205. While the third threshold value may comprise three-quarters of the value n, the present invention is not limited in this way. Accordingly, the third threshold may comprise other values that may be utilized as a threshold in determining whether to invert the expected field value or whether to keep it unchanged.

Figure 3:
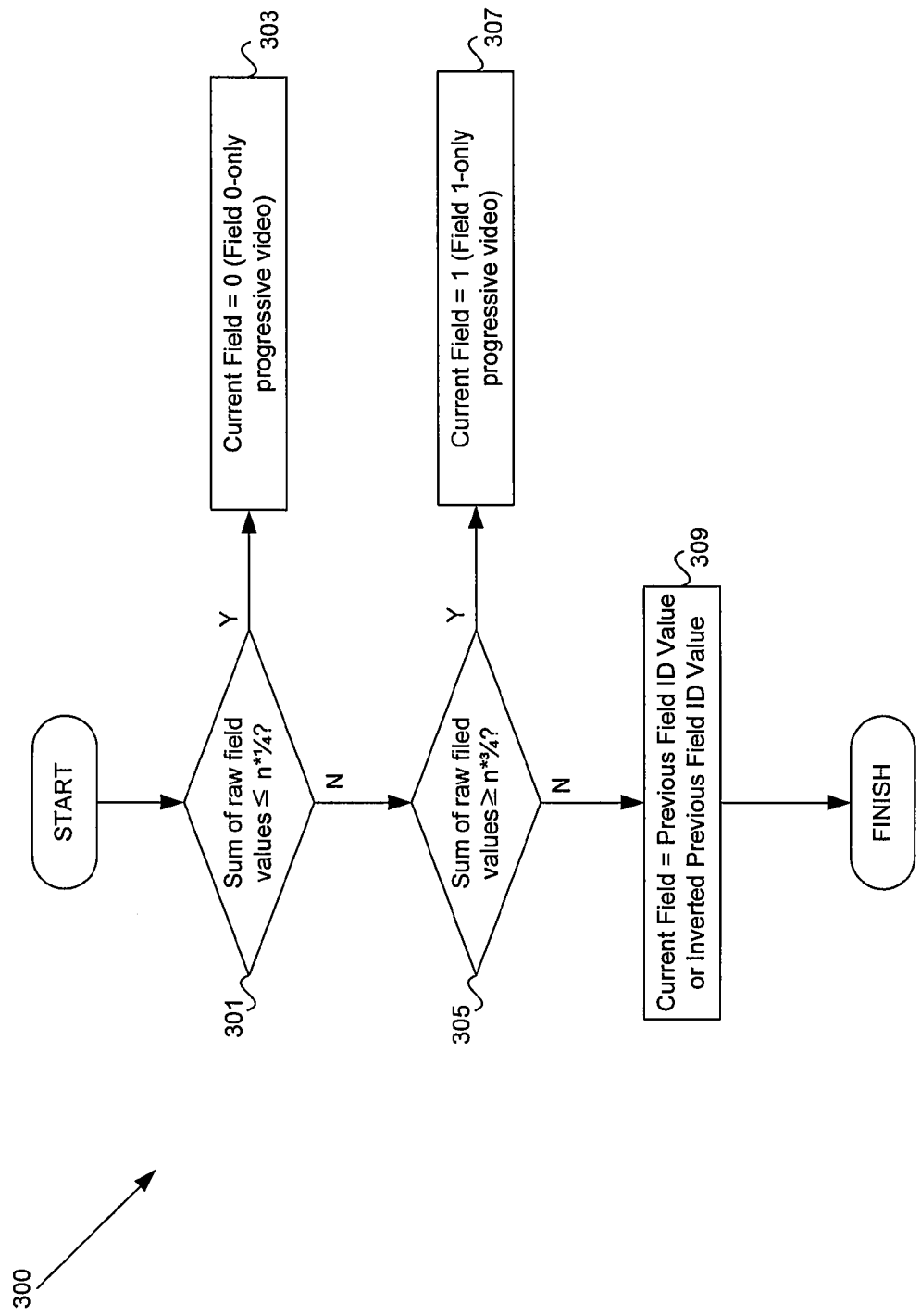
FIG. 3 is a flow diagram of a method for determining a field ID, in accordance with an embodiment of the present invention.

FIG. 3 is a flow diagram of a method 300 for determining a field ID, in accordance with an embodiment of the present invention. The method 300 may be utilized to determine a field ID value for a current field in case where a progressive video signal is decoded. Referring to FIG. 2 and FIG. 3, the shift register 205 may utilize n flip-flops for storing n field ID values for a progressive video signal. At 301, it may be determined whether a sum of the raw field ID values within the shift register 205 is less than or equal to one quarter of the value n. If the sum of the raw field ID values within the shift register 205 is less than or equal to one quarter of the value n, then, at 303, the current field ID value may be estimated at zero.

If the sum of the raw field ID values within the shift register 205 is greater than one quarter of the value n, at 305, it may be determined whether the sum of the raw field ID values within the shift register 205 is greater than or equal to three-quarters of the value n. If the sum of the raw field ID values within the shift register 205 is greater than or equal to three-quarters of the value n, then, at 307, the current field ID value may be estimated to have a value of one. If the sum of the raw field ID values within the shift register 205 is less than three-quarters of the value n, then, at 309, the current field ID value may be estimated to be equal to the previous field ID value or the inverted previous field ID value.

Figure 4:
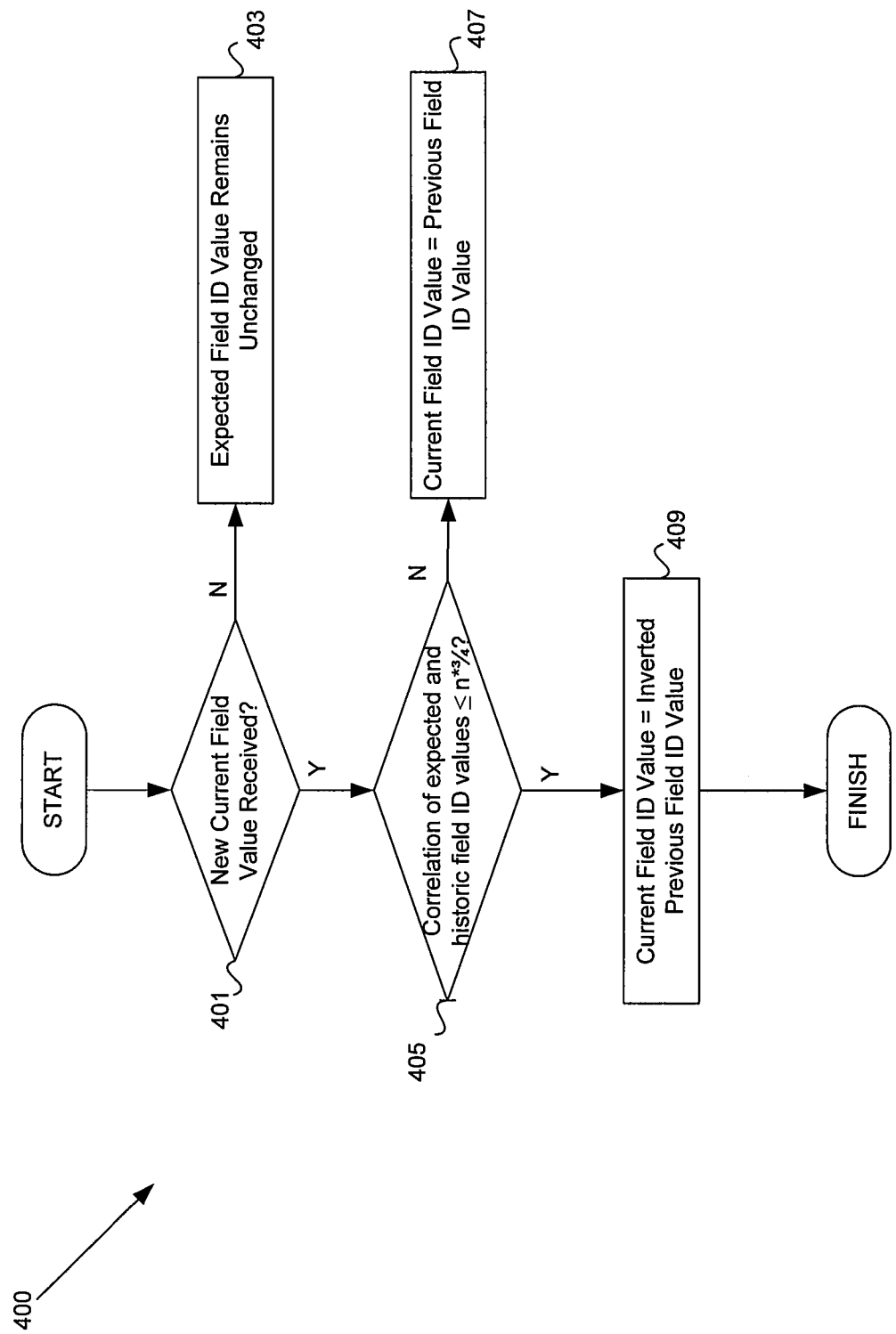
FIG. 4 is a flow diagram of an exemplary method for determining an expected field ID, in accordance with an embodiment of the present invention.

FIG. 4 is a flow diagram of an exemplary method 400 for determining an expected field ID, in accordance with an embodiment of the present invention. The method 400 may be utilized to determine a field ID value for a current field in a case where an interlaced video signal is being decoded. Referring to FIG. 2 and FIG. 4, the shift register 205 may utilize n flip-flops for storing n field ID values for a progressive video signal. At 401, it may be determined whether a new raw field ID value is received by the shift register 205. If there is no new received field ID value, at 403, the expected field ID value remains unchanged. At 405, it may be determined whether a correlation of historic field ID values within the shift register 205 and expected field ID values is less than or equal to three-quarters of the value n. If the correlation of historic field ID values within the shift register 205 and expected field ID values is more than three-quarters of the value n, at 407, the current field ID value may be estimated to be equal to the previous field ID value. If the correlation of historic field ID values within the shift register 205 and expected field ID values is less than or equal to three-quarters of the value n, at 409, the current field ID value may be estimated to be equal to the inverted previous field ID value.

Under normal circumstances, field ID values may be toggling every field that is received. The overall field ID detection process may be achieved by utilizing an accumulator in conjunction with a field detection circuitry. Noise-tolerant field ID detection may be achieved by storing a history of raw field ID's and correlating it to an expected field ID. At each new vertical sync, the new raw field may be added to the history, the oldest sample may be removed, and the Expected Field ID may be inverted. A sum of the history may indicate whether the input is progressive or interlaced, for example. A progressive input may result in a sum near the minimum or maximum value, while middle value may specify an interlaced signal. If the input comprises an interlaced input, the current field may be determined by correlating the history with expected field ID through a series of exclusive OR's. The correlation may reveal whether the field history is mostly in phase with the expected field ID, in which case a majority of the XOR's may be false, or is mostly out-of-phase with the expected field ID, in which case a majority of the XOR's may be true. If the correlation is in the middle, the field ID detection system may default to the expected field ID. As a result, the expected interlaced field flips every new frame, unless it is mostly out of phase. If the expected interlaced field is mostly out of phase, the field ID detection system may leave the expected interlaced field without inverting it.

A system in accordance with an embodiment of the present invention may support field ID detection of both interlaced and progressive frames. In addition, a field ID detection system in accordance with an embodiment of the present invention may possess a scalable depth, which may allow it to be used in a wide variety of applications and to be easily adjusted to various S/N ratios in an input signal.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for determining fields in a video system, the method comprising:
   generating a history of field identification (ID) values for a received video signal;
   generating a sum of the field ID values for the generated history;
   generating a correlation based on the history of field ID values; and
   estimating a field ID value for a current field using the generated correlation or the generated sum of the field ID values, based on a comparison of the generated correlation or the generated sum to at least one threshold value.

2. The method of claim 1, comprising storing the generated history of field ID values in a register.

3. The method of claim 2, comprising shifting the stored history of field ID values, if a new field ID value is generated.

4. The method of claim 1, comprising summing the historic field ID values.

5. The method of claim 4, comprising estimating the field ID value for a current field based on the sum of the stored historic field ID values, if the sum of the stored historic field ID values is within a determined range.

6. The method of claim 1, comprising correlating the historic field ID values with an expected field ID value.

7. The method of claim 1, comprising correlating the historic field ID values with an inverted expected field ID value.

8. The method of claim 1, comprising XORing the historic field ID values with an expected field ID value.

9. The method of claim 1, comprising XORing the historic field ID values with an inverted expected field ID value.

10. A system for determining fields in a video system, the system comprising:
    a shift register that creates a history of field ID values for a received video signal and a sum of the field ID values for the history;
    a correlator that generates a correlation based on the history of field ID values; and
    a processor that estimates a field ID value for a current field using the correlation or the sum of the field ID values, based on a comparison of the correlation or the sum to at least one threshold value.

11. The system of claim 10, wherein the shift register stores the history of field ID values.

12. The system of claim 11, wherein the shift register shifts the stored history of field ID values whenever a new field ID value is generated.

13. The system of claim 10, comprising a summer that sums the historic field ID values.

14. The system of claim 13, wherein the processor estimates the field ID value for a current field based on the sum of the historic field ID values, if the sum of the historic field ID values is within a determined range.

15. The system of claim 10, wherein the correlator correlates the historic field ID values with an expected field ID value.

16. The system of claim 10, wherein the correlator correlates the historic field ID values with an inverted expected field ID value.

17. The system of claim 10, comprising a plurality of XOR gates that XOR the historic field ID values with an expected field ID value.

18. The system of claim 10, comprising a plurality of XOR gates that XOR the historic field ID values with an inverted expected field ID value.

19. A system for determining fields in a video system, the system comprising:
    a shift register comprising a plurality of flip-flops;
    a plurality of XOR gates, wherein at least one input of each of the plurality of XOR gates is coupled to an output of each of the plurality of flip-flops;
    a first summer coupled to an output of each of the plurality of XOR gates;

a second summer coupled to the output of each of the plurality of flip-flops; and an inverter coupled to a second input of each of the plurality of XOR gates.

20. The method according to claim 1, wherein the at least one threshold value comprises a first threshold value and a second threshold value.

21. The method according to claim 20, comprising estimating the field ID value for the current field using the generated sum of the field ID values, if the generated sum is less than the first threshold value or greater than the second threshold value.

22. The method according to claim 1, comprising estimating the field ID value for the current field using an expected field ID value, if the generated correlation of the field ID values is greater than the at least one threshold value.

23. The method according to claim 1, comprising estimating the field ID value for the current field using an inverted expected field ID value, if the generated correlation of the field ID values is less than the at least one threshold value.

24. The system according to claim 10, wherein the at least one threshold value comprises a first threshold value and a second threshold value.

25. The system according to claim 10, wherein the processor estimates the field ID value for the current field using an expected field ID value, if the generated correlation of the field ID values is greater than the at least one threshold value.

26. The system according to claim 10, wherein the processor estimates the field ID value for the current field using an inverted expected field ID value, if the generated correlation of the field ID values is less than the at least one threshold value.

27. The system according to claim 24, wherein the processor estimates the field ID value for the current field using the generated sum of the field ID values, if the generated sum is less than the first threshold value or greater than the second threshold value.

* * * * *